(12) United States Patent
Corbett et al.

(10) Patent No.: US 7,765,341 B2
(45) Date of Patent: Jul. 27, 2010

(54) UNIVERSAL SERIAL BUS DEVICE INCLUDING A USB CONNECTOR AND A TRANSMITTER

(75) Inventors: Christopher J. Corbett, Duvall, WA (US); David McLauchlan, Kirkland, WA (US); Mohammad Shakeri, Kirkland, WA (US); Scott A. Manchester, Redmond, WA (US); David T. Campbell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 10/975,666

(22) Filed: Oct. 28, 2004

(65) Prior Publication Data

US 2006/0069840 A1  Mar. 30, 2006

Related U.S. Application Data

(63) Continuation of application No. 10/951,547, filed on Sep. 28, 2004, now abandoned.

(51) Int. Cl.
*G06F 3/00* (2006.01)
(52) U.S. Cl. .............................. 710/36; 710/20; 710/74
(58) Field of Classification Search .................. 710/36
See application file for complete search history.

(56) References Cited

U.S. PATENT DOCUMENTS

| | | | |
|---|---|---|---|
| 4,102,493 A | 7/1978 | Moreno | |
| 6,148,332 A * | 11/2000 | Brewer et al. | 709/218 |
| 6,324,537 B1 | 11/2001 | Moran | |
| 6,539,380 B1 | 3/2003 | Moran | |
| 7,207,059 B1 * | 4/2007 | Kurian et al. | 726/9 |
| 7,296,098 B2 * | 11/2007 | Shih | 710/13 |
| 2002/0019901 A1 * | 2/2002 | Shin | 710/260 |
| 2003/0167376 A1 | 9/2003 | Koh | |
| 2004/0038592 A1 | 2/2004 | Yang | |
| 2004/0059925 A1 * | 3/2004 | Benhammou et al. | 713/189 |
| 2004/0103288 A1 * | 5/2004 | Ziv et al. | 713/185 |
| 2004/0107303 A1 * | 6/2004 | Mulligan | 710/1 |
| 2004/0236804 A1 * | 11/2004 | Bots et al. | 707/204 |
| 2005/0119936 A1 * | 6/2005 | Buchanan et al. | 705/14 |
| 2005/0149204 A1 | 7/2005 | Manchester et al. | |
| 2005/0216639 A1 * | 9/2005 | Sparer et al. | 710/305 |
| 2006/0069814 A1 | 3/2006 | Abraham et al. | |

(Continued)

OTHER PUBLICATIONS

Universal Serial Bus Device Class Definition for Audio Data Formats Release 1.0, Mar. 18, 1998.*

(Continued)

*Primary Examiner*—Eron J Sorrell
(74) *Attorney, Agent, or Firm*—Marshall, Gerstein & Borun LLP

(57) ABSTRACT

A Universal Serial Bus (USB) flash drive comprising a controller including a USB interface and a nonvolatile computer readable medium interface. The USB flash drive may also comprise a nonvolatile computer readable medium in communication with the nonvolatile computer readable medium interface and storing data and a USB connector in communication with the USB interface. The USB flash drive may also comprise a transmitter for transmitting at least a portion of data from the nonvolatile computer readable medium to an external device external to the USB flash drive. The transmitter may be substantially simultaneously operable with the USB connector, may send a modulated data signal, and/or may send the at least portion data in a compressed format.

39 Claims, 6 Drawing Sheets

U.S. PATENT DOCUMENTS

2006/0095647 A1* 5/2006 Battaglia et al. ............ 711/100
2006/0101456 A1 5/2006 Crosier et al.

OTHER PUBLICATIONS

Advanced Audio distribution Profile Specification Adopted Version 1.0 Dated, May 22, 2003.*
21stCentury Locks Fingerprint Locks, http://www.21stcenturylocks.com/outbacker.htm, pp. 1-4.
Biometric Drives Featured Products, http://www.cpustuff.com/flashdrive.html, pp. 1-3.
Biometric External Devices Featured Products, http://www.cpustuff.com/biometric_external.htm, pp. 1-3.
Creative Nomad MuVo NX, Features and Benefits, http://nomadworld.com/products/muvo_nx/features.asp, pp. 1-2.
Gemplus, GemClub-Memo, http://www.gemplus.com/products/gemclub_memo/, pp. 1-3.
Gemplus, Chipware, http://www.gemplus.com/techno/chipware/index.html, pp. 1-2.
Gemplus, GPM8K, http://www.gemplus.com/products/gpm8k/index.html, pp. 1-2.
Trekstor USA. Thumbdrive(TM) Secure details, http://www.trekstorusa.com/thumbdrive_secure.htm, pp. 1-2.
USB Flash Drive FAQ. http://www.usbflashdrive.org/usbfd_faq.html, pp. 1-6.

* cited by examiner

UNIVERSAL SERIAL BUS DEVICE INCLUDING A USB CONNECTOR AND A TRANSMITTER

CROSS REFERENCE TO RELATED APPLICATION

This application claims priority to and is a continuation of U.S. patent application Ser. No. 10/951,547, filed Sep. 28, 2004, which is incorporated herein by reference.

TECHNICAL FIELD

The present application relates to a peripheral device, and more specifically, to a universal serial bus device.

BACKGROUND

A Universal Serial Bus ("USB") is an external bus that supports plug and play installation. Using a USB port of a computer system, a user may connect and disconnect devices without shutting down or restarting the computer. A single USB port may connect multiple peripheral devices, including speakers, telephones, CD-ROM drives, joysticks, tape drives, keyboards, scanners, memory drives, and cameras, such as through daisy chaining the peripheral devices into one port of the computer system.

Flash memory is a type of nonvolatile computer readable medium, similar to EEPROM memory in function, but may be erased in blocks. Because of its block-oriented nature, flash memory is typically used as a supplement to or replacement for hard disks in portable computers. In this context, flash memory is typically built into the unit, available as a PC Card that can be plugged into a PCMCIA slot, or available as a USB device compatible with a USB port.

SUMMARY

The following presents a simplified summary of the disclosure in order to provide a basic understanding to the reader. This summary is not an exhaustive or limiting overview of the disclosure. The summary is not provided to identify key and/or critical elements of the invention, delineate the scope of the invention, or limit the scope of the invention in any way. Its sole purpose is to present some of the concepts disclosed in a simplified form, as an introduction to the more detailed description that is presented later.

USB flash drives are typically used to store data in a nonvolatile computer readable medium when it is physically connected to a USB port of a computer system. Since a USB flash drive is portable, e.g., removable from the computer system USB port, a USB flash drive may transfer data to another computer system when it is attached to the USB port of another computer system. However, not all devices have a USB port. To transfer stored data to an external device not compatible with the USB protocol, the USB flash drive may include a transmitter capable of transmitting data from the USB flash drive directly to an external device.

USB flash drives may also include a computer readable medium partitioned into public and private partitions. The public partition may be accessible through normal channels of access. However in some cases, the private partition may be accessed only through authentication of a credential provided by the user or computer system. Only users or systems providing a valid credential may access data stored in the private partition. The credential may be received by a decision component of the USB flash drive to authenticate the credential and allow access to the private partition.

Prior art USB devices generally rely on power derived through the physical connection of the USB connector to the USB port of a computer system. In this manner, USB devices rely on the USB port connection to provide power and function to the components within the USB device. To allow a USB device to function, such as to transfer data, apart from an intervening computer system, the USB device may include a power supply, independent of the USB connector, to provide power to one or more components of the USB device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
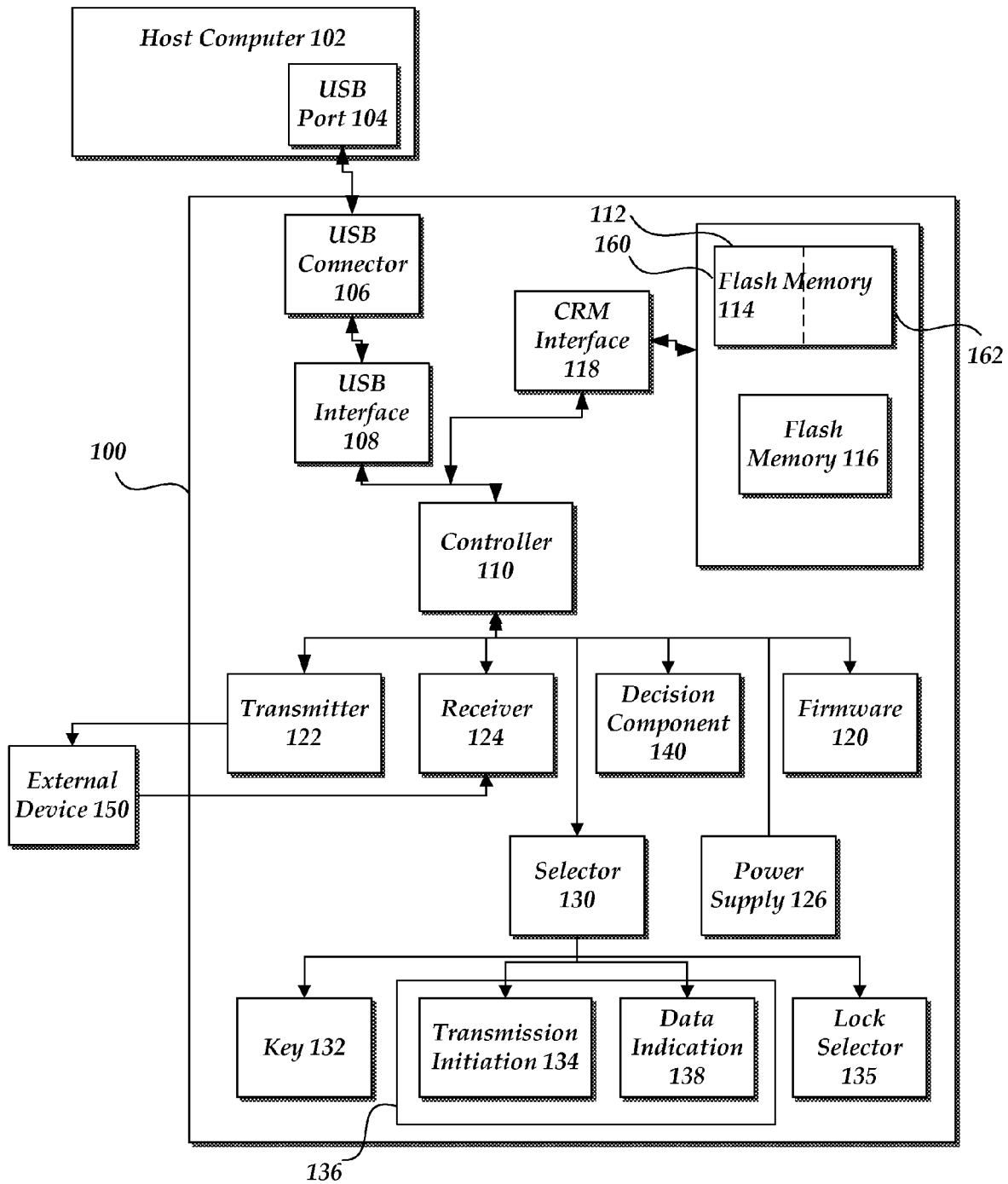
FIG. 1 is a schematic illustration of an example USB flash drive in one embodiment.

FIG. 1 illustrates an example USB flash drive 100. As shown in FIG. 1, the USB flash drive 100 may be connected to a host computer system 102 through a physical connection of the USB connector 106 of the flash drive 100 into the USB port 104 of the host computer system 102. The USB connector 106 may be any suitable USB connector including a Type A USB connector, a Type B USB connector, and a mini-USB connector. As shown in FIG. 1, the USB connector 106 may be in communication with a USB interface 108 of a controller 110. The USB flash drive 100 may include a nonvolatile computer readable medium 112 which may include one or more flash memories 114, 116, which may be controlled by the controller 110 through the nonvolatile computer readable medium interface 118. The controller 110 may also access appropriate firmware 120 such as an operating system to control the operation and function of the USB connector and the nonvolatile computer readable medium. The controller 110 may be any suitable controller including a processor, a special purpose state device, or any other appropriate controller.

In the prior art, a computer system could access the data stored in the nonvolatile medium 112 through a physical connection and communication between a host system USB port 104 and the USB connector 106 of the flash drive 100. However, a user may desire to transfer data to another device while the flash drive is connected to the host computer system and/or to transfer data to devices without a USB port. Accordingly, the flash drive 100 may include a transmitter 122 controlled by the controller 100 as shown in FIG. 1. The transmitter may be any suitable component for transmitting data from the computer readable medium 112 to an external device

150. In one example, the transmitter 122 may be substantially operable with the USB connector 106, such as information may be transmitted by the transmitter while the USB connector is connected to the USB port of the host computer 102.

The transmitter may transmit compressed data. For example, the data from the computer readable medium 112 may be stored in a compressed format and/or compressed by the controller, e.g., compressed by any suitable method to decrease the amount of memory and/or bandwidth. Compressed data may be expanded by any suitable method to allow the data to be used and/or accessed for its intended purpose or function.

The transmitter may transmit a modulated data signal and/or may transmit the data wirelessly, e.g., without a direct physical connection between the USB flash drive and the external device 150. The transmitter may directly transmit data. As used herein, 'directly transmitting' means that the data is transmitted from the USB flash drive 100 to another device 150 without any intervening host computer system and without peripheral communication wires, e.g., wireless communications. For example, a suitable direct transmitter 122 may include a USB port suitable for accepting a USB connector of another device. In this manner, data may be transferred directly from the USB flash drive to the external device, without any intervention by the host computer system 102 connected to the USB connector 106 of the flash drive 100. In another example of direct transmission, the transmitter 122 may send a modulated data signal with the data encoded onto the modulated data signal. In one example, the transmitter may include a frequency transmitter such as an infrared transmitter similar to those used on small form computing devices including personal digital assistant computing devices and cellular telephones. Other suitable frequency transmitters may support radio frequency, acoustic, ultraviolet, optical, and the like. Other transmitter types may be suitable including magnetic field data transmitters and any other wireless media. The transmission of the data may be governed by any appropriate protocol, such as the Infrared Data Association (IrDA) standards, BlueTooth protocols, radio frequency identification protocols, and the like.

Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of communication media.

Transfer of data from the nonvolatile memory to the external device 150 through the transmitter 122 may be initiated by any appropriate method or device. In one example, the user may provide a transmission initiation indication through the host computer system to initiate transmission of data to an external device. More particularly, a client driver (not shown) of the host computer system 102 may provide a dialog, menu, displayed button, or other appropriate user interface or selector which allows a user to initiate transfer of data. The host computer system may communicate the transmission initiation indication to the USB flash drive through the USB connection. In response to the transmission initiation indication, the transmitter may transmit data to the external device.

In another example, transfer of data through the transmitter 122 may be initiated through selection of one or more selectors 130 of the USB flash drive. For example, as shown in FIG. 1, the USB flash drive 100 may include a transmission initiation selector 134, such as a button, selector wheel, and the like. Upon selection of the transmission initiation selector, the transmitter 122 may transmit all or a portion of the data stored in the computer readable medium 112 to the external device 150. In another example, connection of the external device to the transmitter may automatically initiate transmission. For example, if the transmitter is a USB port described above, connection of a USB connector into the USB port of the USB flash drive 100 may initiate transmission. In some cases it may be suitable for each device, i.e., the USB flash drive and the external device, to automatically exchange information when attached such that transmission and reception of data is automatically initiated. In other cases, it may suitable for the USB flash drive and/or external device to include a transmission direction selector such as an arrow, selector, switch, and the like to indicate the data flow to be used if transmission is initiated. More particularly, the USB flash drive 100 may include one or more selectors 130, to indicate whether the USB flash drive is the 'transmitter' of data and/or the 'receiver' of data to/from the external device 150. In other cases, a default device may be predetermined as the sender and/or receiver of data. For example, the device having the USB connector connected to the USB port of another device may be considered the 'transmitter' of data, and the device having the USB port connected to the USB connector may be considered the 'receiver' of data. It is to be appreciated that other suitable default settings and/or selectors may be appropriate.

Any suitable method may be used to determine which portion of the data stored in the nonvolatile computer readable medium may be transmitted. For example, all of the data stored in the nonvolatile computer readable medium 112 may be transmitted upon activation of the transmission initiation selector. In another example, the data portion to be transmitted may be predetermined or pre-set by the user and/or the manufacturer of the USB flash drive. For example, the user may indicate the selected portion of data to be transmitted which may be stored in a predetermined partition of the computer readable medium and/or the location for data to be transmitted may be determinable by the controller 110. When transmission is initiated, the controller may send to the transmitter 122 the predetermined portion of data.

In another example, a host device 102 may be connected to the USB flash drive 100 through the physical USB connection, allowing a user to access and/or determine the data portions, such as files, documents, executables, memory partitions, and other components available on the computer readable medium 112 of the USB flash drive. In this manner, the host computer system may provide a user interface, such as a dialog, tabular display, and the like, allowing a user to select a particular data portion to be transmitted.

In another example, the USB flash drive may provide a user interface allowing a user to select a portion of data to be transmitted. As shown in FIG. 1, the USB flash drive 100 may include one or more selectors 130 allowing a user to select a data portion. Each selector may be associated with a particular data component (e.g., file, executable, data portion, and the like) and/or may be associated with a particular memory partition. For example, the user may associate a particular data file with a data indicator 138 which may be a button, wheel selector, alpha-numeric keys, or any other suitable selector of the USB flash drive 100. More particularly, the USB flash drive may include an alpha-numeric keypad, e.g., button '1', button '2', button '3', and button '4'. The user may associate selected files and/or memory partitions to particular alpha-numeric keys, e.g., file 1 may be associated with button '1', file 2 may be associated with button '2', memory partition 3 may be associated with button '3', and the like. Moreover, a selected data portion may be associated with a particular series, combination, and/or timing of selector initiation. For example, a series selection of button '1' and then button '2' may be associated with a data portion. In another example, a combination of substantially simultaneous activation of button '1' and button '2' may be associated with a data portion. In another example, a timing sequence such as pressing button '1' in a "shave and a haircut two bits" rhythm may be associated with another data portion. In another example, a data indicator 138 may be associated with a plurality of data portions associated in a sequence. In this manner, sequential activations of the data indicator 138 may 'scroll' through the available data portions to indicate the selected data portion to be transmitted. More particularly, a single activation of the data indicator 138 may select a first data portion, a double activation of the data indicator in a predetermined amount of time may select a second data portion, and the like. Combinations of the above (series, combinations, timing, and the like) should be included within the scope of selecting a data indicator.

In another example, the user and/or flash drive manufacturer may partition the non-volatile memory into one or more data partitions. In this manner, all data stored in the partition may be transmitted if that particular data partition is selected. It is to be appreciated that any other suitable indication of the selected data portion may be appropriate.

In a specific example, a user may wish to transfer her wireless settings to another user wishing to use the wireless network. Using her host computer system, the user may select her wireless setting data partition and activate the transmission initiation selector of the USB flash drive to transfer those settings to another user. Example methods of transferring wireless setting data is further described in U.S. Application No. 60/534,795 filed Jan. 7, 2004; Ser. No. 10/807,095 filed Mar. 23, 2004; and Ser. No. 10/866,336 filed Mar. 23, 2004, all assigned to Microsoft. Corp. and incorporated by reference herein. In another example, the user may associate a personal information data file with a particular data indicator of the USB flash drive.

In this manner, the user may active the data indicator in an appropriate manner (e.g., sequence, combination, and/or timing) to select the personal information data file and then activate the transmission initiation selector to transmit the personal information, such as an v-card, to the external device. In one example the transmission initiation selector 134 and the data indicator selector 138 may be integrated into a single selector 136 as shown in FIG. 1. In this manner, a user may indicate initiation of transmission of a first data portion with a first activation of a first data select/transmit selector 136, and may indicate initiation of transmission of a second data portion with a second activation of a second data select/transmit selector 136.

Figure 2:
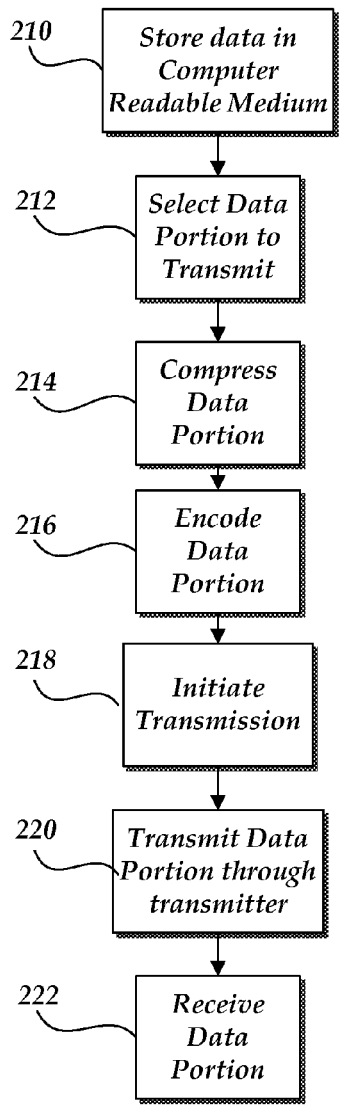
FIG. 2 is a flow chart of an example method of transmitting data using the USB flash drive of FIG. 1 in one embodiment.

One example method 200 of transmitting data from a USB flash device is illustrated in FIG. 2 with reference to the example USB flash drive of FIG. 1. Initially, data is stored 210 in the nonvolatile computer readable medium of the USB flash drive 100 shown in FIG. 1. The data portion to be transmitted may be selected 212. For example, as noted above with reference to FIG. 1, the user may select a data portion to transmit through a user interface of the host computer system 102, through a data indicator 138, and/or through one or more selectors 130. The data portion to be transmitted may be any portion or combination of a memory partition and/or file, executable, and the like. The controller may compress 214 the selected data portion. The controller and/or transmitter may encode 216 the data portion onto a modulated data signal. The user may then initiate 218 transmission of the selected data portion, such as through a user interface of the host computer system and/or through a transmission initiation selector 134 of the USB flash drive 100. The transmitter may transmit 220 the data portion, and the external device may receive 222 the data portion.

To accept a data transmission from an external device 150, the USB flash drive 100 may include a receiver 124 controlled by the controller 110 as shown in FIG. 1. The receiver may be any suitable component for receiving data from the external device 150. The receiver 124 may include a receiver of the same type as the transmitter, and may be integrated as a transceiver. Alternatively, the receiver may be of a different type than the transmitter 122.

The receiver may receive compressed data. For example, the receiver may receive the transmitted data from the external device 150 in a compressed format e.g., compressed by any suitable method to decrease the amount of memory and/or bandwidth. Compressed data may be expanded by the controller by any suitable method to allow the data to be used and/or accessed for its intended purpose or function.

The receiver may receive a modulated data signal and/or may receive the data wirelessly, e.g., without a direct physical connection between the USB flash drive and the external device 150. The receiver may directly receive data. As used herein, 'directly receiving' means that the data is received from an external device other than a host 102 computer system to the USB flash drive 100 without any intervening host computer system and without peripheral communication wires. For example, a suitable receiver 124 may include a USB port of the USB flash drive 100 suitable for accepting a USB connector of another device. In this manner, data may be transferred directly from the external device to the USB flash drive, without intervention by the host computer system 102 connected to the USB connector 106 of the flash drive 100. In another example of directly receiving, the receiver may wirelessly receive a modulated data signal with the data encoded onto the modulated data signal. The wireless receiver may include an infrared receiver, a radio frequency receiver, an acoustic receiver, an ultraviolet frequency receiver, an optical frequency receiver, a magnetic field data receiver, and any other wireless media receiver. The reception of the data may be governed by any appropriate protocol, such as Infrared Data Association (IrDA) standards, BlueTooth protocols, radio frequency identification protocols, and the like.

As noted above, the nonvolatile computer readable medium 112 may be partitioned into at least a first and second partition. In some cases, it may be suitable to protect information from public access, and as such, one or more partitions may be indicated as public and one or more other partitions may be indicated as private. As shown in FIG. 1, flash memory 114 may be partitioned into a public partition 160 and a private and protected partition 162. The public partition may be accessible as typical flash memory of a USB flash drive. However, the private partition may be hidden, e.g., not exposed, and/or encrypted to protect the data stored in the private partition from unauthorized access. Accordingly, to access the data stored in the private partition, an authentic credential must be presented. A credential may be any suitable combination of a password, fingerprint, radio frequency identifier, written signature, voice signature, cryptographic key, retina, facial features, physical key, and the like. The credential may be presented to the USB device through any suitable method.

For example, the host computer 102 may present a user interface to the user through a display of the host computer. In this manner, the user may input a password through the keyboard of the host computer system, write a signature with a digital pen on a suitable tablet device, speak any word or a predetermined password into a microphone, and the like. In another example, the host computer system 102 shown in FIG. 1 may automatically provide a previously stored credential if provided by the user to allow a user automatic access to the private partition when the USB flash drive 100 is connected to a pre-approved host computer system with a stored credential.

In another example, the user may present the credential through one or more selectors 130 of the USB flash drive 100, shown in FIG. 1. Similar to the various series, combinations, and/or timing of selectors discussed above with reference to data portion selection, a user may present the credential to the USB flash drive 100 through a predetermined series, combination, and/or timing of activation of one or more selectors 130. In another example, the USB flash drive may provide one or more key selectors 132 specifically adapted to receive a credential. In one example, the key selector 132 may include a biometric device such as a fingerprint sensor detecting a fingerprint of a finger placed proximate the biometric device or a retina sensor detecting a retina. In another example, the key selector 132 may include an alpha-numeric key pad or any other suitable selector which may also be used to indicate a selected data portion.

The credential, after being received, may be authenticated in any suitable manner such as by comparing the received credential with a basis credential. The basis credential may be pre-stored on a trusted host computer system. Additionally and/or alternatively, the basis credential may be stored on the USB flash drive 100. The basis credential may be stored on the USB flash drive in any suitable manner, such as part of the firmware 120 and/or in the nonvolatile computer readable medium 112, e.g., in the private partition 162.

A decision component may compare the received credential with the basis credential and may be supported by any suitable computing device. The decision component 140 may be described in the general context of computer-executable instructions, such as program modules, being executed by a processor. Generally, program modules include routines, programs, objects, components, data structures, etc. that perform particular tasks or implement particular abstract data types. For example, the decision component may be provided by a host computer system 102 attached to the USB flash drive through the USB connector. The decision component may be part of the USB driver or any other component supported by the host computer system. For example in operation, the host computer system 102 may provide a user interface to accept the credential input by the user and/or receive the credential from the USB flash drive 100. The host computer system may communicate the input credential to the decision component for authentication. The decision component may access the basis credential, stored in any suitable manner, and compare the received credential with the stored basis credential. Upon authentication of the credential, the host computer system may provide a user interface to allow the user to access the data stored in the private partition.

Additionally and/or alternatively, the decision component may be supported by the USB flash drive 100. For example, as shown in FIG. 1, the USB flash drive may include a decision component 140 accessed by the controller 110. In this manner, the USB flash drive may authenticate the received credential. For example, the user may input a credential, such as through one or more selectors 130 and/or received from the host computer 102. The controller may communicate the received credential to the decision component 140. In response to the received credential, the decision component may access a stored basis credential and compare the basis and received credentials. Upon authentication of the credential, the controller in communication with the decision component of the USB flash drive may allow access to the data stored in the private partition of the nonvolatile computer readable medium. For example, the controller may expose and/or decrypt the data stored in the private partition.

In some cases, the credential allowing access to the private partition may include completion of some action and/or operation by the user. For example, to access the private partition, the user may be required to review and/or access a predetermined data file such as rules regarding use of the information stored in the private partition, advertisements, and the like. More particularly, the user may be presented with advertisements of products and/or services which are provided by advertisers. The advertisement review may be required for credential authentication each time a credential is provided; at the beginning of a time period, e.g., daily, weekly, and the like; and/or the first time a user requests access to the private partition. The advertisements or other data may be stored on the USB flash drive as appropriate, such as in the firmware and/or the nonvolatile computer readable medium.

After the required action such as review of an advertisement is completed, the USB flash drive may delete the data providing the action/operation as appropriate. For example, if the user is required to review one or more advertisements only the first time the private partition is accessed, the USB flash drive may delete the advertisement from the nonvolatile computer readable medium or allow the user to overwrite the memory location, to allow the user to use that memory for their directed purpose. Alternatively, the USB flash drive may 'burn a fuse' to that portion of memory storing the data supporting the required action. For example, memory can be read using a low voltage across a physical bridge. The 'read only' bridge may be 'broken' or burned like a fuse by applying a higher voltage. In another example, the controller and its associated memory may include a virtual or physical switch which may be flipped to deny access to the memory location. In this manner, a virtual fuse, or access to the private partition, may be burned.

As noted above, a decision component, such as the decision component 140 shown in FIG. 1, may attempt to authenticate the received credential. If the decision component determines that the received credential is not authentic, the USB flash drive may deny access to the private partition of the computer readable medium. Access may be denied by maintaining the hidden and/or encrypted status of the data stored in the private partition. In some cases, the USB flash drive may not only deny access, but also remove access to the data of the private partition by 'burning a fuse' to the data as described above. After the fuse is burned, a user may not access the data in the private partition, even if an authentic credential is subsequently provided to the USB flash drive; however in some cases, an authorized dealer may be able to access and/or retrieve data stored in the private partition if the user presents suitable credentials.

The decision component may receive a second credential, e.g., a second try by the user to fulfill the credential requirement. However, the decision component may refuse to authenticate a received credential, such as if the user submits a predetermined number of inauthentic credentials. For example, the controller may maintain a credential attempt count. After a predetermined number of inauthentic credentials, the USB flash drive may deny access to the private partition in any suitable manner.

The USB flash drive may request a credential to access the private partition from time to time or after a predetermined event. For example, to maintain access to the private partition, the controller may require the user to re-present a credential after a pre-determined amount of time has passed, whenever there is a power cycle to the USB flash drive, whenever the host computer system engages a screen saver, whenever the host computer system is put to 'sleep' or 'placed on standby', whenever the user 'logs off' the host computer system, or any other suitable event. In another example, the USB flash drive may include one or more selectors 130, such as a lock selector 135, which when activated may lock the private partition such that an authentic credential must be presented before further access is allowed. Accordingly, to access the private partition after the predetermined time and/or event, the user may be required to present a credential to be re-authenticated, such as by the decision component.

Figure 3:
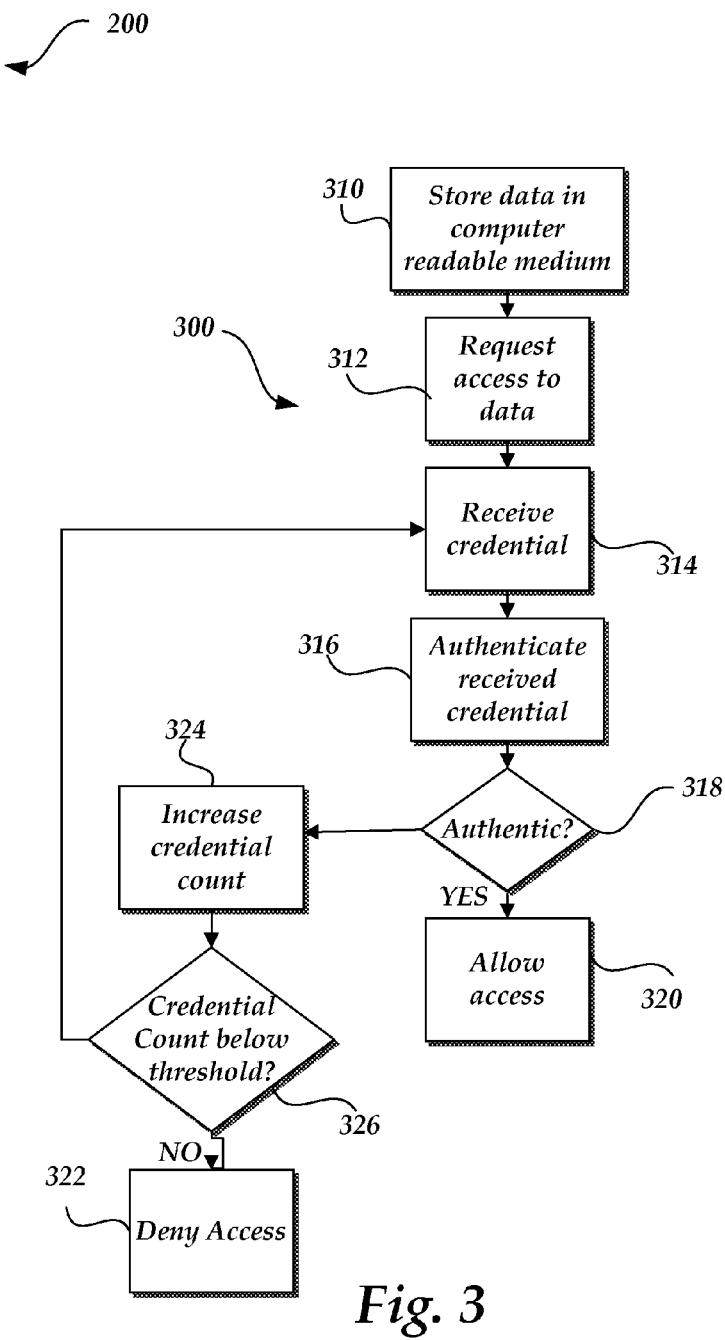
FIG. 3 is a flow chart of an example method implementing credential authentication in one embodiment.

One example method 300 of authenticating a credential in a USB flash device is illustrated in FIG. 3 with reference to the example USB flash drive of FIG. 1. Initially, data is stored 310 in a private partition of the nonvolatile computer readable medium of the USB flash drive 100 shown in FIG. 1. The private partition may be any portion of the computer readable medium 112, such as a predetermined amount of memory storage, one or more particular files and/or documents, all of the available memory storage of the computer readable medium, and any other suitable portion. The user may request 312 data stored in the private partition. For example, the user may select a 'view private partition' selector and in response, a user interface dialog may request a credential from the user. In another example, presentation of a credential may automatically request access to the private partition. In either case, the user may present a credential, which is received 314 by host computer and/or USB flash drive, as noted above. The credential may then be authenticated 316, such as by a decision component of the host computer system and/or the USB flash drive. If the credential is authenticated 318, access to the private partition may be allowed 320, such as by exposing and/or decrypting the data stored in the private partition. If the credential is not authentic, the user may be able to present an additional credential to be authenticated. In this case, the credential attempt count may be increased 324, such as by the host computer system and/or USB flash drive controller. The credential attempt count may then be compared 326 to a predetermined value to determine if further action should be taken. For example, if the credential attempt count is below a predetermined value, further credentials may be received and authenticated. However, if the credential attempt count exceeds or equals a predetermined value, further attempts to authenticate a credential maybe denied 322. Access to the private partition may be denied by maintaining hiding or encryption of the private partition, burning a fuse to the private partition, refusing to receive and/or authenticate additional credentials, and/or in any other suitable manner. In some cases, denial of receiving credentials to be authenticated may be maintained until a predetermined event occurs. For example, the predetermined event may be the expiration of a period of time, the USB flash drive is connected to a predetermined host computer system, the USB flash drive is released by an authorized dealer, or any other suitable event.

As noted above, a USB device typically derives power for operation through the direct physical attachment of the USB connector 106 to the USB port 104 of the host computer system 102. To allow the USB flash drive 100 to function, such as to transfer data, separated from a host computer system 102, the USB flash drive may include a power supply 126, independent of an the USB connector 106, to provide power to one or more components of the USB flash drive. For example, as shown in FIG. 1, the power supply may provide power to the controller 110, the computer readable medium 112, the transmitter 122, the receiver 124, the selectors 130, firmware 120, and/or the decision component 140. Any suitable power supply 126 may be used as appropriate in the USB flash drive 100 including any combination of a battery, a solar power system, a piezoelectric system, a power system energized by an external frequency or magnetic field including those similar to radio frequency identification systems, and the like. For example, the USB flash drive 100 may include a power supply 126 including a battery which may be recharged from time to time by power derived from host computer system 102 through the USB connector and/or a solar power supply such as solar cells. In this manner, the USB flash drive may derive power from the host computer 102 when the USB connector is physically attached to the USB port and may also operate separated from the host computer 102. Accordingly, the USB flash drive may transmit data from the nonvolatile computer medium 112 to an external device without a host computer system attachment. Similarly, the USB flash drive may receive and authenticate a credential to access a private partition without a direct attachment to a host computer system. Similarly, any USB device may provide its intended function and/or operation without a physical attachment to a host computer system.

Figure 4:
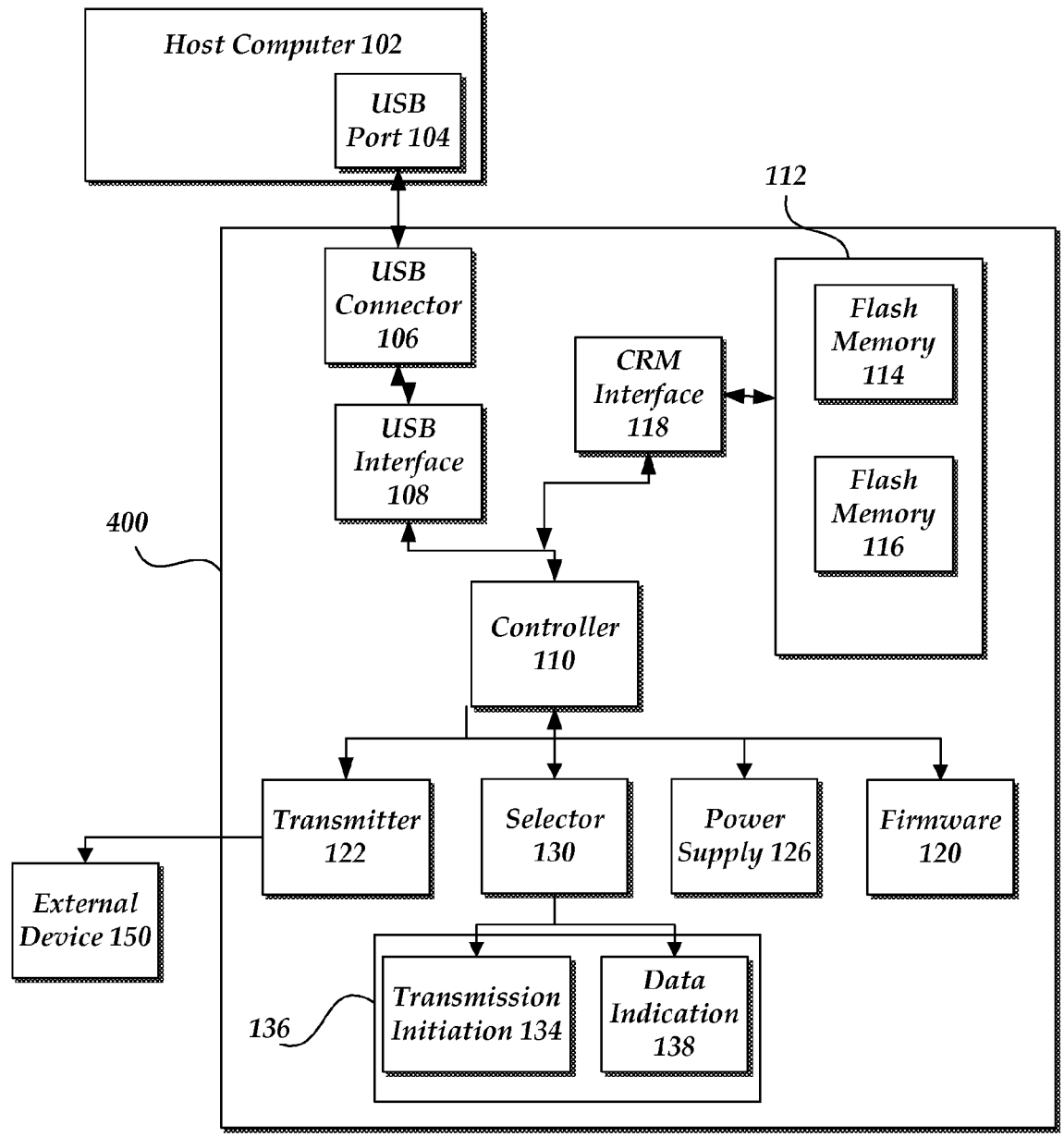
FIG. 4 is a schematic illustration of an example USB flash drive in one embodiment.

FIGS. 4-7 illustrate various combinations of the elements described above, where like reference numbers represent like elements. For example, FIG. 4 illustrates a USB flash drive 400. The USB flash drive 400 may include a USB connector 106 connectable with a USB port of a host computer system 104, a controller 110, firmware 120, a USB interface 108, and a computer readable medium interface 118. The USB flash drive may also include a nonvolatile computer readable medium which may include one or more flash memories 114, 116. The USB flash drive may include a transmitter 122 which may transmit data from the computer readable medium 112 to an external device 150. The data may be transmitted by the transmitter directly, compressed, wirelessly, and/or over a modulated data signal designed to encode digital information. The USB flash drive may also include one or more selectors which may include a transmission initiation selector 134 and/or a data indicator 138. The USB flash drive 400 may include a power supply 126 providing power to one or more components of the USB flash drive. In this manner, a user may receive a data transfer and store the received data in the flash memory without requiring a connection of the USB connector 106 to the USB port 104.

Figure 5:
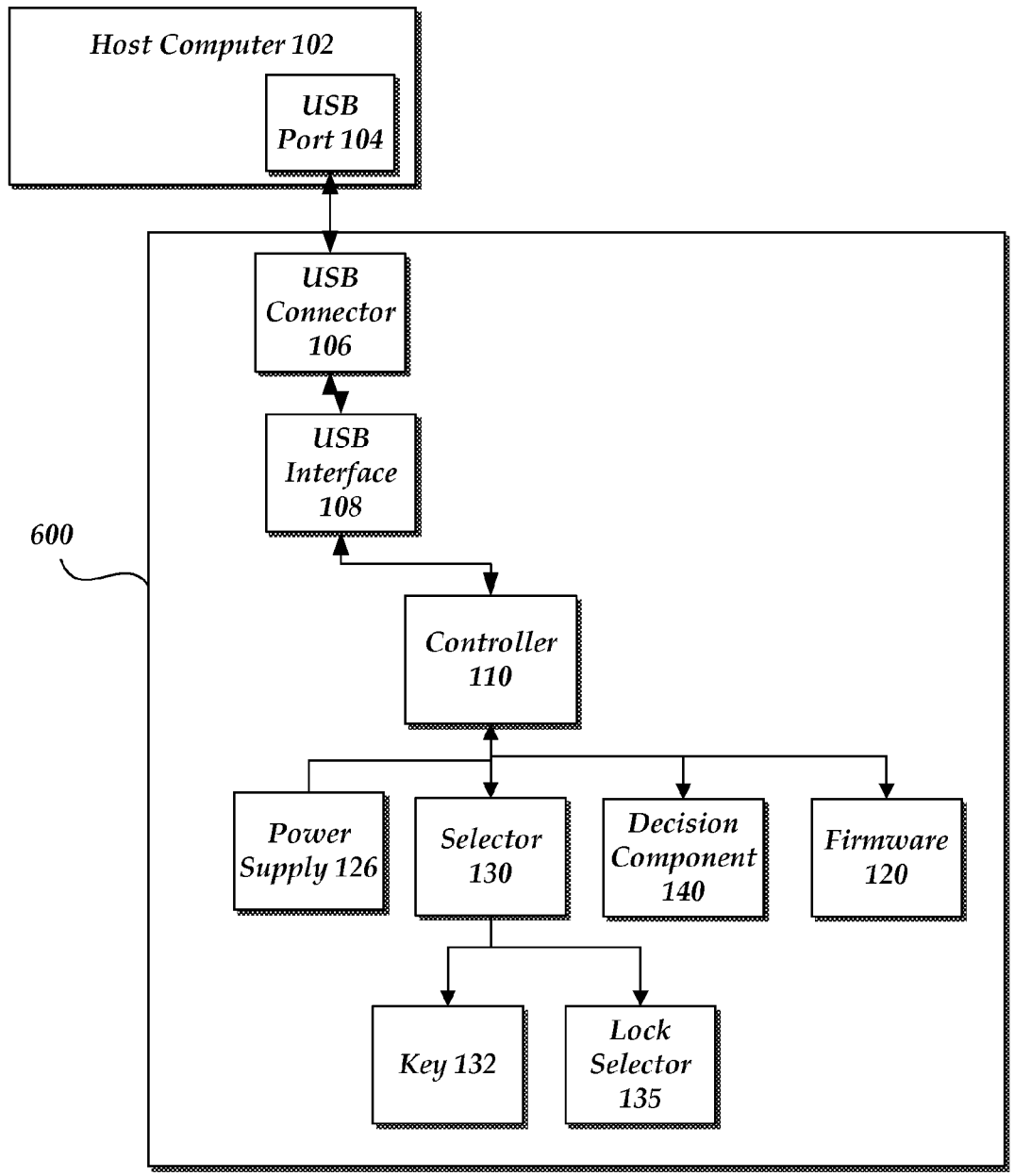
FIG. 5 is a schematic illustration of another example USB flash drive in one embodiment.

FIG. 5 illustrates a USB flash drive 500. The USB flash drive 500 may include a USB connector 106 connectable with a USB port of a host computer system 104, a controller 110, firmware 120, a USB interface 108, and a computer readable medium interface 118. The USB flash drive may also include a nonvolatile computer readable medium which may include one or more flash memories 114, 116. The USB flash drive may include a receiver 124 which may receive data from an external device 150 apart from the USB connector 106. The data may be received by the receiver 124 directly, compressed, wirelessly, and/or over a modulated data signal designed to encode digital information. The USB flash drive may also include one or more selectors 130.

Figure 6:
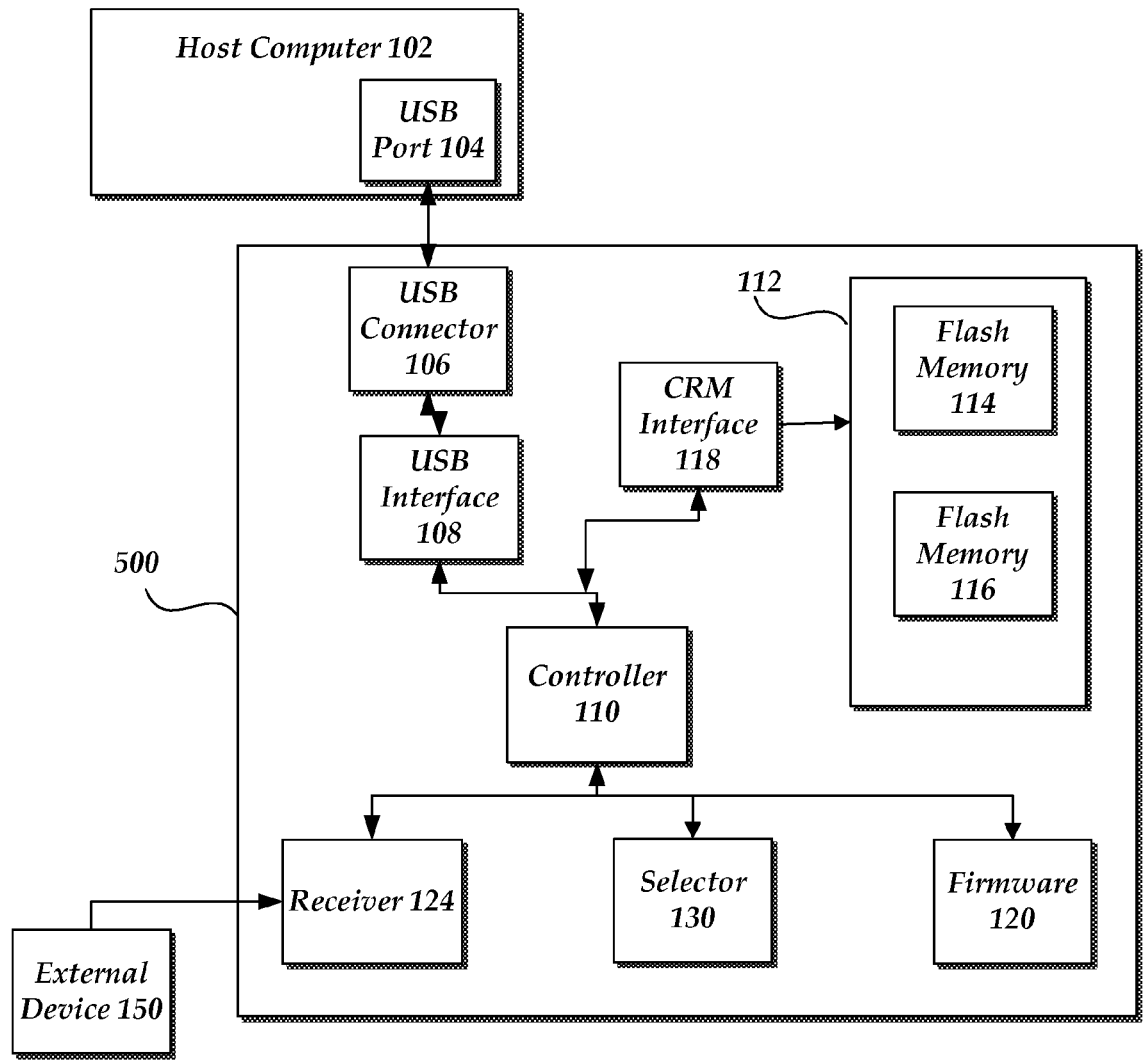
FIG. 6 is a schematic illustration of an example USB device in one embodiment.

FIG. 6 illustrates a USB device 600 which may be any type of USB compatible device such as a consumer electronic device, a printer, a scanner, a memory device, and the like. The USB device 600 may include a USB connector 106 connectable with a USB port of a host computer system 104, a controller 110, firmware 120, and a USB interface 108. The USB device 600 may include one or more selectors 130 such as keys 132, which may allow a user to present a credential such as a password or other credential to the USB device without having to interface through the host computer system 102. The received credential may be authenticated by the decision component 140 of the USB device. If the credential is authenticated, a function and/or operation of the USB device may be allowed. For example, memory may be accessed, memory read and/or write privileges may be granted, printer functions may be accessed, and/or the like. The USB device 600 may also include a lock selector 135 which allows a user to reset a lock, requiring a user to re-present a valid credential to access the locked function and/or operation. The USB device 600 may include a power supply 126 providing power to one or more components of the USB device. In this manner, a user may provide a credential, authenticate a credential, and/or provide a function and/or operation of the USB device without requiring a connection of the USB connector 106 to the USB port 104 of a host computer system.

Figure 7:
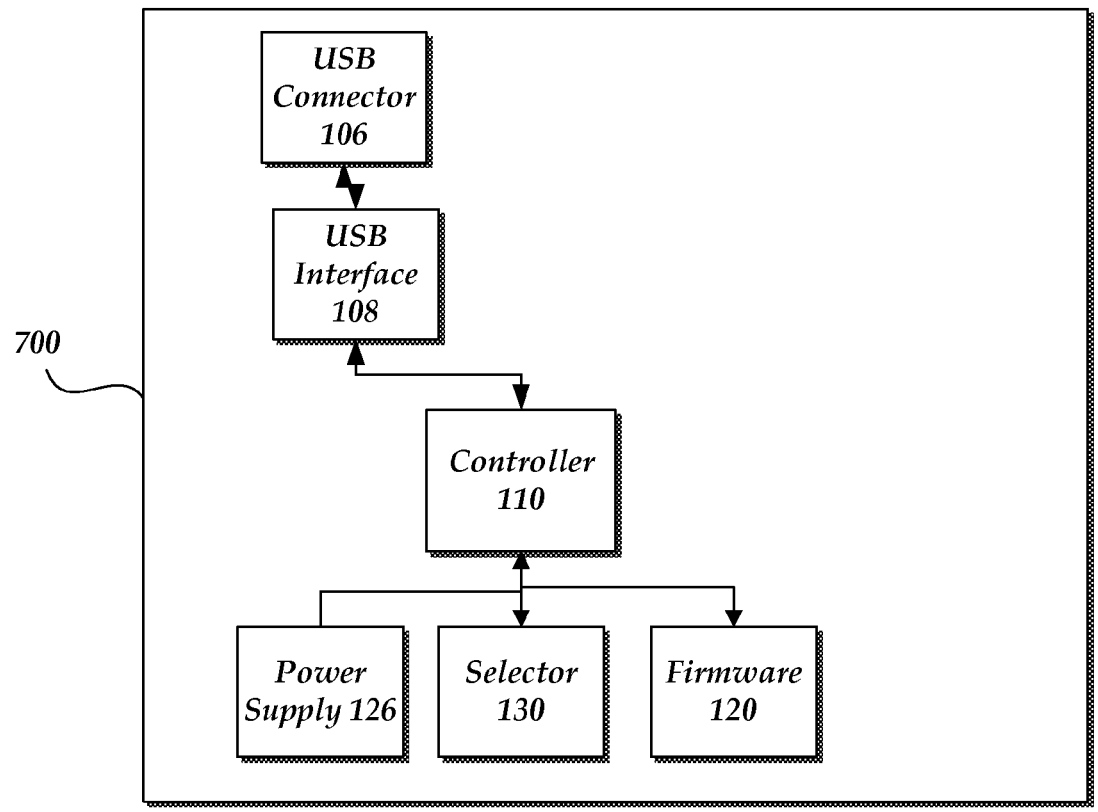
FIG. 7 is a schematic illustration of another example USB device in one embodiment.

FIG. 7 illustrates a USB device 700 which may be any type of USB compatible device such as a consumer electronic device, a printer, a scanner, a memory device, and the like. The USB device 700 may include a USB connector 106 connectable with a USB port of a host computer system 104, a controller 110, firmware 120, and a USB interface 108. The USB device 600 may include one or more selectors 130. The USB device 700 may include a power supply 126 providing power to one or more components of the USB device. In this manner, the USB device may provide a function and/or an operation of the USB device without requiring a connection of the USB connector 106 to the USB port 104 of a host computer system. In one example, the power supply 126 may be charged with power received through a connection of the USB connector with a USB port of a host computer system.

USB devices 600, 700 may include a variety of computer readable media. Computer readable media can be any available media that can be accessed by a controller of the USB device and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the controller of the USB device.

The drives and their associated computer storage media discussed above and illustrated in FIGS. 1, 4, 5, 6, and 7 provide storage of computer readable instructions data structures, program modules and other data for the USB device.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The embodiments of the invention in which an exclusive property or privilege is claimed are defined as follows:

1. A Universal Serial Bus (USB) flash drive comprising:
   (a) a controller including a USB interface and a nonvolatile computer readable medium interface;
   (b) a nonvolatile computer readable medium in communication with the nonvolatile computer readable medium interface and configured to store data, wherein the nonvolatile computer readable medium is partitioned into at least a public partition and a private partition;
   (c) a USB connector in communication with the USB interface;
   (d) a decision component for authenticating a credential and in communication with the controller for allowing access to the private partition only if the credential is authentic, wherein the credential includes displaying an advertisement;
   (e) a transmitter that transmits at least a selected portion of data from the nonvolatile computer readable medium to an external device external to the USB flash drive, the transmitter being simultaneously operable with the USB connector, wherein the transmitter is separate from the USB connector; and
   (f) a transmission initiation selector, wherein upon selection of the transmission initiation selector the transmitter initiates transmission of the at least selected portion of data from the nonvolatile computer readable medium to the external device, the at least selected portion of data not being stored on a device supplying power to the USB flash drive and the transmission of the at least selected portion not being controlled by the device supplying power to the USB flash drive.

2. The USB flash drive of claim 1, wherein the transmitter constructed and adapted to transmit said selected portion of data wirelessly to the external device.

3. The USB flash drive of claim 1, wherein the transmitter includes an infrared transmitter.

4. The USB flash drive of claim 1, wherein the controller is constructed and adapted to compress at least a portion of the data from the nonvolatile computer readable medium to form said selected portion of the data to be transmitted.

5. The USB flash drive of claim 1, further comprising a power supply suitable for providing power to the controller, the nonvolatile computer readable medium, and the transmitter.

6. The USB flash drive of claim 1, further comprising a receiver for receiving a data transmission from the external device, the receiver being simultaneously operable with the USB connector.

7. The USB flash drive of claim 6, further comprising a transceiver including the transmitter and the receiver.

8. The USB flash drive of claim 7, wherein the transceiver includes a USB port constructed and adapted to physically connect with a USB connector of the external device.

9. The USB flash drive of claim 8, further comprising a transmission direction indicator for selecting a direction of data flow when transmission is initiated.

10. The USB flash drive of claim 1, wherein the transmitter in communication with the controller is constructed and adapted to encode said selected portion of data to form a modulated data signal for transmission to the external device.

11. The USB flash drive of claim 1, wherein said selected portion of data is predetermined.

12. The USB flash drive of claim 1, further comprising a transmission data selector for selecting said selected portion of data to be transmitted.

13. The USB flash drive of claim 1, wherein upon selection of the transmission initiation selector the transmitter initiates transmission of the at least selected portion of data from the nonvolatile computer readable medium to the external device.

14. The USB flash drive of claim 1, further comprising at least one transmission direction selector that indicates a direction of transmission of data to be from the nonvolatile computer readable medium to the external device.

15. The USB flash drive of claim 1, further comprising at least one transmission direction selector that indicates a direction of transmission of data to be from the external device to the nonvolatile computer readable medium.

16. The USB flash drive of claim 1, further comprising at least one transmission direction selector that is selected to indicate the selected portion of data to be transmitted from the nonvolatile computer readable medium to the external device.

17. The USB flash drive of claim 1, wherein the selected portion is predetermined by a user.

18. A method for communication between a first device and a Universal Serial Bus (USB) device, the method comprising:
(a) providing the USB device including a USB connector, a transmitter, and a computer readable medium;
(b) compressing at least a selected portion of data from the computer readable medium to form compressed data;
(c) receiving a selection at a transmission initiation selector, wherein upon receiving the selection at the transmission initiation selector the transmitter initiates transmission of the at least selected portion of data from the USB device to the first device when a credential is determined to be authentic;
(d) sending the compressed data to the first device through the transmitter, wherein the transmitter is simultaneously operable with the USB connector, wherein the transmitter is separate from the USB connector, the USB device receiving power through the USB connector from a second device, the second device being different from the first device, said sending not being controlled by the second device;
(e) receiving the compressed data at the first device; and
(f) burning a fuse when the credential is determined to be inauthentic, wherein burning the fuse prevents access to the at least selected portion of data.

19. The method of claim 18, wherein said sending includes wirelessly sending the compressed data to the first device.

20. The method of claim 19, wherein the transmitter includes an infrared transmitter.

21. The method of claim 18, wherein the transmitter includes a USB port constructed and adapted to physically connect to a USB connector of the first device, wherein the compressed data is USB compatible.

22. The method of claim 18, further comprising receiving a transmission initiation indication from a host computer connected to the USB connector of the USB device.

23. The method of claim 18, further comprising formatting the compressed data to form a modulated data signal representing the compressed data.

24. The method of claim 18, wherein the USB device includes a receiver, the method further comprising receiving a portion of data from the first device through the receiver.

25. The method of claim 18, wherein the USB device includes a data indicator, the method further comprising selecting said selected portion of data with the data indicator.

26. The method of claim 18, further comprising receiving from a host computer system connected to the USB connector of the USB device, an indication of said selected portion of data to be compressed.

27. The method of claim 18, wherein the USB device is a USB flash drive.

28. A Universal Serial Bus (USB) flash drive comprising:
(a) a controller including a USB interface and a nonvolatile computer readable medium interface;
(b) a nonvolatile computer readable medium in communication with the nonvolatile computer readable medium interface and configured to store data;
(c) a USB connector in communication with the USB interface;
(d) a transmitter that transmits a modulated data signal representing at least a selected portion of data from the nonvolatile computer readable medium to an external device external to the USB flash drive, wherein the transmitter is separate from the USB connector, the USB flash drive receiving power from a second device through the USB connector, the second device being different from the external device;
(e) a transmission initiation selector, wherein upon selection of the transmission initiation selector the transmitter initiates transmission of the at least selected portion of data from the USB flash drive to the external device when a credential is determined to be authentic, the transmission not being controlled by the second device; and
(f) a decision component configured to determine whether the credential is authentic and to deny access to the at least selected portion of data by burning a fuse when a predetermined number of inauthentic credentials are submitted.

29. The USB flash drive of claim 28, wherein the transmitter is constructed and adapted to transmit the modulated data signal wirelessly to the external device.

30. The USB flash drive of claim 28, wherein the transmitter includes an infrared transmitter.

31. The USB flash drive of claim 28, wherein the controller is constructed and adapted to compress the data from the nonvolatile computer readable medium to form said selected portion of the data represented by the modulated data signal.

32. The USB flash drive of claim 28, further comprising a power supply suitable for providing power to the controller, the nonvolatile computer readable medium, and the transmitter.

33. The USB flash drive of claim 28, further comprising a receiver for receiving a data transmission from the external device.

34. The USB flash drive of claim 33, wherein the receiver includes a USB port constructed and adapted to physically connect with a USB connector of the external device.

35. The USB flash drive of claim 34, further comprising a transmission direction selector for selecting a direction of data flow when transmission is initiated.

36. The USB flash drive of claim 28, wherein said selected portion of data is predetermined.

37. The USB flash drive of claim 36, wherein the nonvolatile computer readable medium is partitioned into at least a first partition and a second partition, and the predetermined portion of data includes the first partition.

38. The USB flash drive of claim 28, further comprising a transmission data selector for selecting said selected portion of data to be transmitted.

39. The USB flash drive of claim 28, wherein the nonvolatile computer readable medium is partitioned into at least a public partition and a private partition, the USB flash drive further comprising a decision component for authenticating a credential and in communication with the controller for allowing access to the private partition only if the credential is authentic.

* * * * *